(12) United States Patent
Vollet et al.

(10) Patent No.: US 10,162,910 B2
(45) Date of Patent: Dec. 25, 2018

(54) METHOD AND APPARATUS FOR CONFIGURING WIRING

(71) Applicant: GM GLOBAL TECHNOLOGY OPERATIONS LLC, Detroit, MI (US)

(72) Inventors: Rogerio Vollet, Troy, MI (US); James Zito, Rochester Hills, MI (US); James Midtun, Chandler, AZ (US); Sonal Bhatt, Chandler, AZ (US)

( * ) Notice: Subject to any disclaimer, the term of this patent is extended or adjusted under 35 U.S.C. 154(b) by 198 days.

(21) Appl. No.: 15/342,247

(22) Filed: Nov. 3, 2016

(65) Prior Publication Data

US 2018/0121568 A1    May 3, 2018

(51) Int. Cl.
*G06F 17/50*    (2006.01)
*G06G 7/62*    (2006.01)

(52) U.S. Cl.
CPC .......... *G06F 17/50* (2013.01); *G06F 17/5077* (2013.01); *G06F 2217/36* (2013.01)

(58) Field of Classification Search
None
See application file for complete search history.

(56) References Cited

U.S. PATENT DOCUMENTS 4,977,370 A * 12/1990 Andrews ............ G01R 1/07378
324/73.1

OTHER PUBLICATIONS

"Missing Wire Spec", 3 pages, Jan. 22, 2009, Jan. 23, 2009, Jan. 26, 2009, posts @ https://communities.mentor.com/message/3266#comment-3266.
"How to defined the constraint to automatically generated wire CSA or P/NO of Combined ground signal in Integrator Design?" 5 pages, Jan. 5, 2013, posts @ https://communities.mentor.com/message/37495#comment-37495.

* cited by examiner

*Primary Examiner* — David Silver

(57) ABSTRACT

A method and apparatus for determining settings of wires in an electrical system are provided. The method includes setting a first wire setting of a wire from among a plurality of wires to a pin setting of a pin attached to the wire if the pin has a pin setting; setting the first wire setting to a first connector setting of a first connector attached to the pin if the pin does not have a pin setting and the connector setting includes a default setting; and setting the first wire setting to at least one from among: a second pin setting of a second pin attached to the wire from among the plurality of pins; and a second connector setting of a second connector attached to the second pin if the pin does not have a pin setting and the first connector setting does not have a default setting.

17 Claims, 3 Drawing Sheets

METHOD AND APPARATUS FOR CONFIGURING WIRING

INTRODUCTION

Apparatuses and methods consistent with exemplary embodiments relate to configuring wire settings in electrical systems. More particularly, apparatuses and methods consistent with exemplary embodiments relate to configuring wire gauges in electrical systems.

SUMMARY

One or more exemplary embodiments provide a method and an apparatus that determine a gauge or a size of a wire in an electrical system. More particularly, one or more exemplary embodiments provide a method and an apparatus that resolves wire gauging conflicts in electrical systems based on electrical architecture rules.

According to an aspect of an exemplary embodiment, a method for configuring settings of wires in an electrical system is provided. The method includes receiving information on a plurality of pin settings corresponding to a plurality of pins, receiving information on a plurality of connector settings of a plurality of connectors, receiving information on a plurality of wires connected to the plurality of pins; and for each wire of the plurality of wires, first performing: setting a first wire setting of a wire from among the plurality of wires to a pin setting of a pin attached to the wire from among the plurality of pins if the pin has a pin setting; setting the first wire setting to a first connector setting of a first connector attached to the pin from among the plurality of connectors if the pin does not have a pin setting and the connector setting includes a default setting; setting the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and in response to detecting a conflict between the first wire setting and a second wire setting of the wire corresponding to the second pin attached to the wire from among the plurality of pins, second performing: setting the first wire setting to a larger setting from among the first wire setting and the second wire setting if the pin is a ground pin and the second pin is a ground pin or if the pin is a not a ground pin and the second pin is not a ground pin; and setting the first wire setting to correspond to the second wire setting if the pin is a ground pin and the second pin is not a ground pin.

The second performing may further include: outputting a notification of a ground pin error if the first wire setting is larger than a setting of the pin and the pin is a ground pin or if the first wire setting is larger than a setting of the second pin and the second pin is a ground pin; and outputting a notification of a pin and a second pin mismatch if the pin is not a ground pin or the second pin is not a ground pin.

The method may further include: for each signal from among the plurality of signals, third performing: determining unset wires that are part of a signal; setting the first wire setting of the unset wires to a largest from among the first wire setting of all wires that are part of the signal; and reporting a signal if all wires on the signal are unset.

The third performing may further include: determining whether the signal has more than one wire setting assigned to wires on the signal; and reporting the signal if it is determined that the signal has more than one wire setting assigned to wires on the signal.

The third performing may further include: determining whether the signal has at least one wire with a wire setting larger than a pin setting of a ground pin assigned to the signal; and reporting a ground stud error if the signal has at least one wire with the wire setting larger than the pin setting of the ground pin assigned to the signal.

The reporting the signal and the reporting the ground stud error may include displaying information on a display screen.

The method may further include displaying a wiring diagram comprising one or more from among the plurality of wires, the plurality of pins, the plurality of pin settings corresponding the plurality of pins, the first wire setting, and the second wire setting.

The method may further include highlighting, outlining or distinguishing the signal with more than one wire setting assigned to wires on the signal and the pin with the ground stud error.

The plurality of pin settings corresponding the plurality of pins, the first wire setting, the connector setting, and the second wire setting may include at least one from among a size, a wire gauge, a diameter, and an electrical rating.

According to an aspect of another exemplary embodiment, an apparatus for configuring settings of wires in an electrical system is provided. The apparatus includes: at least one memory comprising computer executable instructions; and at least one processor configured to read and execute the computer executable instructions. The computer executable instructions cause the at least one processor to: receive information on a plurality of pin settings corresponding to a plurality of pins; receive information on a plurality of connector settings of a plurality of connectors; and receive information on a plurality of wires connected to the plurality of pins; and for each wire of the plurality of wires, first perform: setting a first wire setting of a wire from among the plurality of wires to a pin setting of a pin attached to the wire from among the plurality of pins if the pin has a pin setting; setting the first wire setting to a first connector setting of a first connector attached to the pin from among the plurality of connectors if the pin does not have a pin setting and the connector setting includes a default setting; setting the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and in response to detecting a conflict between the first wire setting and a second wire setting of the wire corresponding to the second pin attached to the wire from among the plurality of pins, second performing: setting the first wire setting to a larger setting from among the first wire setting and the second wire setting if the pin is a ground pin and the second pin is a ground pin or if the pin is a not a ground pin and the second pin is not a ground pin; and setting the first wire setting to correspond to the second wire setting if the pin is a ground pin and the second pin is not a ground pin.

According to an aspect of another exemplary embodiment, a non-transitory computer readable medium comprising computer executable instructions executable by a processor to perform a method for configuring the settings of wires. The method includes: for each wire of the plurality of wires, first performing: setting a first wire setting of a wire from among a plurality of wires to a pin setting of a pin attached to the wire from among a plurality of pins if the pin has a pin setting; setting the first wire setting to a first connector setting of a first connector attached to the pin if the pin does not have a pin setting and the connector setting includes a default setting; and setting the first wire setting to at least one from among: 1) a second pin setting of a second pin attached to the wire from among the plurality of pins; and 2) a second connector setting of a second connector attached to the second pin if the pin does not have a pin setting and the first connector setting does not have a default setting.

Other objects, advantages and novel features of the exemplary embodiments will become more apparent from the following detailed description of exemplary embodiments and the accompanying drawings.

DETAILED DESCRIPTION

Figure 1:
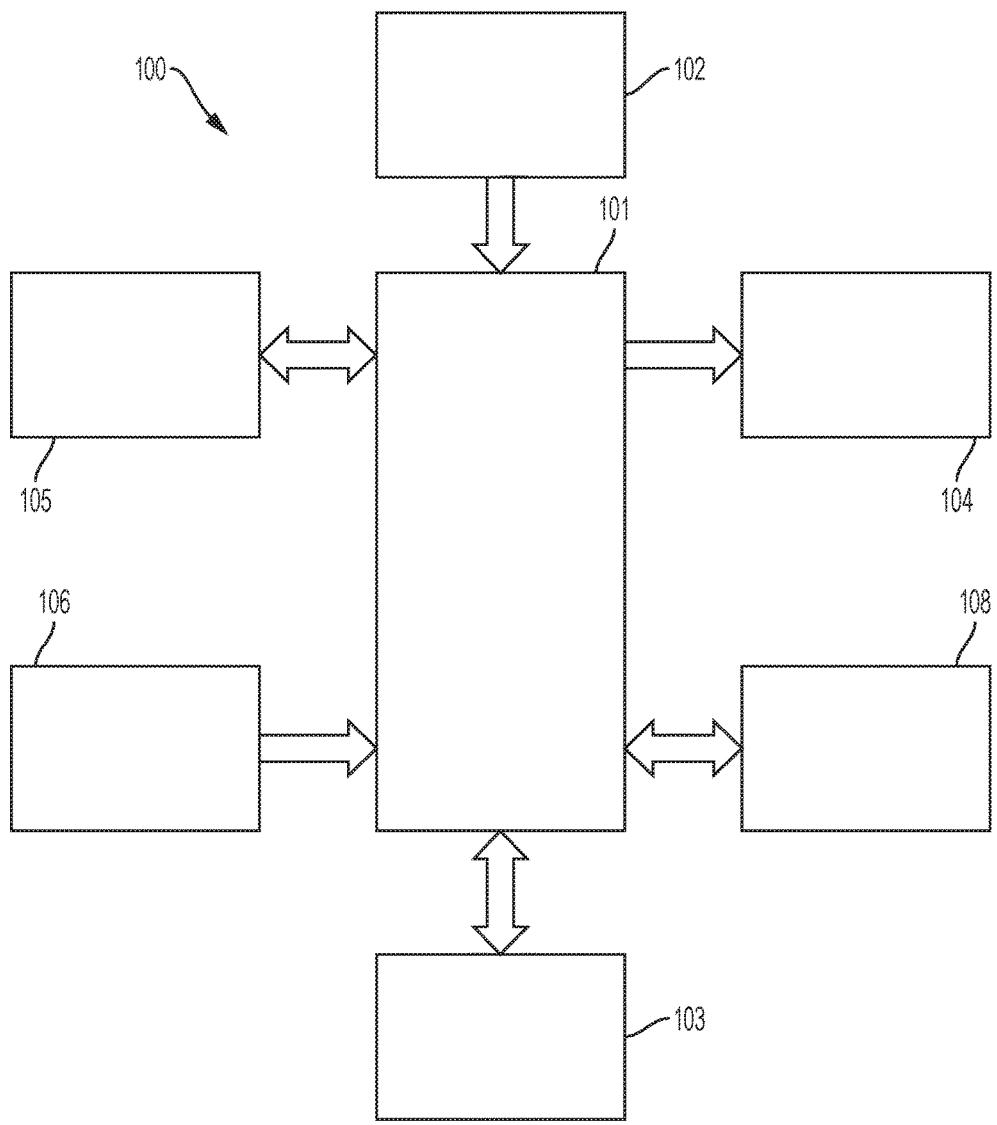
FIG. 1 shows a block diagram of an apparatus that configures settings of wires according to an exemplary embodiment.

An apparatus and method that configure wire settings will now be described in detail with reference to FIGS. 1-2B of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to" "formed on," or "disposed on" a second element, the first element may be connected directly to, attached directly to, formed directly on, or disposed directly on the second element or there may be intervening elements between the first element and the second element, unless it is stated that a first element is "directly" connected to, attached to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Wiring diagrams and schematics may include wire settings, components, connectors, power sources, fuses, and grounding elements used to design electrical systems and ensure proper electrical system design. The diagrams or schematics may be used to determine issues with electrical systems and correct the issues by analyzing system parameters, guidelines, and architecture. One aspect of designing an electrical system is determining the wire settings for wires that carry signals and connect components. Wire settings may include one or more from among a size, a wire gauge, a diameter, and an electrical rating. Thus, it is desirable to design an electrical system with correct wire settings and detect and fix potential errors with wire settings in electrical systems.

FIG. 1 shows a block diagram of an apparatus for configuring wire settings 100 according to an exemplary embodiment. As shown in FIG. 1, the apparatus for configuring wire settings 100, according to an exemplary embodiment, includes a controller 101, a power supply 102, a storage 103, an output 104, a wire setting determiner 105, a user input 106, and a communication device 108. However, the apparatus for configuring wire settings 100 is not limited to the aforementioned configuration and may be configured to include additional elements and/or omit one or more of the aforementioned elements.

The controller 101 controls the overall operation and function of the apparatus for configuring wire settings 100. The controller 101 may control one or more of a storage 103, an output 104, a wire setting determiner 105, a user input 106, and a communication device 108 of the apparatus for configuring wire settings 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The controller 101 is configured to send and/or receive information from one or more of the storage 103, the output 104, the wire setting determiner 105, the user input 106, and the communication device 108 of the apparatus for configuring wire settings 100. The information may be sent and received via a bus or network, or may be directly read or written to/from one or more of the storage 103, the output 104, the wire setting determiner 105, the user input 106, and the communication device 108 of the apparatus for configuring wire settings 100.

The information may include a plurality of pin settings corresponding to a plurality of pins. In addition, the information may include information on a plurality of wires. Moreover, the information may include information on the connections of a plurality of wires such as connections to pins, components, and connector information. The information may also include a size, a wire gauge, a diameter, and an electrical rating of pins, components, connectors, wires, etc.

The power supply 102 provides power to one or more of the controller 101, the storage 103, the output 104, the wire setting determiner 105, the user input 106, and the communication device 108 of the apparatus for configuring wire settings 100. The power supply 102 may include one or more from among a battery, an outlet, a capacitor, a solar energy cell, a generator, a wind energy device, an alternator, etc.

The storage 103 is configured for storing information and retrieving information used by the apparatus for configuring wire settings 100. The storage 103 may be controlled by the controller 101 to store and retrieve information on a plurality of pin settings corresponding to a plurality of pins, the information on a plurality of wires, the information on the connections of a plurality of wires such as connections to pins, components, and connector information, and the information on sizes, wire gauges, diameters, and electrical ratings of pins, components, connectors, wires, etc. The storage 103 may also include the computer instructions configured to be executed by a processor to perform the functions of the apparatus for configuring wire settings 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for configuring wire settings 100. The output 104 may include one or more from among a speaker, a display, a centrally-located a display, a head up display, a windshield display, a haptic feedback device, a vibration device, a tactile feedback device, a tap-feedback device, a holographic display, an instrument light, an indicator light, etc.

The output 104 may output a notification of a ground pin error if the first wire setting is larger than a setting of the pin and the pin is a ground pin or if the first wire setting is larger than a setting of the second pin and the second pin is a ground pin, a notification of a pin and a second pin mismatch if the pin is not a ground pin or the second pin is not a ground pin, a notification corresponding to a signal if all wires on the signal are unset, and/or a notification corresponding to the signal if it is determined that the signal has more than one wire setting assigned to wires on the signal.

Moreover, the output 104 may display a wiring diagram comprising one or more from among the plurality of wires, a plurality of pins, a plurality of pin settings corresponding the plurality of pins, a first wire setting, and a second wire setting. The output 104 may highlight, outline or otherwise distinguish identification information of wires, pins, connectors, etc.

The wire setting determiner 105 may be a separate module or component, or may be part of the controller 101. The wire setting determiner 105 may include one or more from among circuitry, a processor, hardware, and software. The wire setting determiner 105 may be configured to perform for each wire of the plurality of wires, first perform: setting a first wire setting of a wire from among the plurality of wires to a pin setting of a pin attached to the wire from among the plurality of pins if the pin has a pin setting; setting the first wire setting to a first connector setting of a first connector attached to the pin from among the plurality of connectors if the pin does not have a pin setting and the connector setting includes a default setting; setting the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and in response to detecting a conflict between the first wire setting and a second wire setting of the wire corresponding to the second pin attached to the wire from among the plurality of pins, the wire setting determiner 105 may be configured to second perform: setting the first wire setting to a larger setting from among the first wire setting and the second wire setting if the pin is a ground pin and the second pin is a ground pin or if the pin is a not a ground pin and the second pin is not a ground pin; and setting the first wire setting to correspond to the second wire setting if the pin is a ground pin and the second pin is not a ground pin.

Moreover, the second performing may further include outputting a notification of a ground pin error if the first wire setting is larger than a setting of the pin and the pin is a ground pin or if the first wire setting is larger than a setting of the second pin and the second pin is a ground pin and outputting a notification of a pin and a second pin mismatch if the pin is not a ground pin or the second pin is not a ground pin.

The wire setting determiner 105 may be further configured to, for each signal from among the plurality of signals, third perform: determine unset wires that are part of a signal; set the first wire setting of the unset wires to a largest from among the first wire setting of all wires that are part of the signal; and report a signal if all wires on the signal are unset. The third performing may further include: determining whether the signal has more than one wire setting assigned to wires on the signal; and reporting the signal if it is determined that the signal has more than one wire setting assigned to wires on the signal. In addition, the third performing may also include: determining whether the signal has at least one wire with a wire setting larger than a pin setting of a ground pin assigned to the signal; and reporting a ground stud error if the signal has at least one wire with the wire setting larger than the pin setting of the ground pin assigned to the signal. In this case, the reporting may include outputting the report through the output 104.

The user input 106 is configured to provide information and commands to the apparatus for configuring wire settings 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The user input 106 may be configured to receive a setting corresponding to the at least one wire. The wire setting may be set or unset prior to receiving the user input. Moreover, the setting may be a size, a wire gauge, a diameter, or an electrical rating.

The communication device 108 may be used by apparatus for configuring wire settings 100 to communicate with various types of external apparatuses according to various communication methods. The communication device 108 may be used to send/receive information to/from the controller 101 of the apparatus for configuring wire settings 100.

The communication device 108 may include various communication modules such as one or more from among a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

The controller 101 of the apparatus for configuring wire settings 100 may be configured to receive information on a plurality of pin settings corresponding to a plurality of pins; receive information on plurality of connector settings of a plurality of connectors; and receive information on a plurality of wires connected to the plurality of pins; and The controller 101 of the apparatus for configuring wire settings 100 may be configured to receive information on a plurality of pin settings corresponding to a plurality of pins; receive information on a plurality of connector settings of a plurality of connectors; and receive information on a plurality of wires connected to the plurality of pins; and for each wire of the plurality of wires, first perform: setting a first wire setting of a wire from among the plurality of wires to a pin setting of a pin attached to the wire from among the plurality of pins if the pin has a pin setting; setting the first wire setting to a first connector setting of a first connector attached to the pin from among the plurality of connectors if the pin does not have a pin setting and the connector setting includes a default setting; setting the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and in response to detecting a conflict between the first wire setting and a second wire setting of the wire corresponding to the second pin attached to the wire from among the plurality of pins, second performing: setting the first wire setting to a larger setting from among the first wire setting and the second wire setting if the pin is a ground pin and the second pin is a ground pin or if the pin is a not a ground pin and the second pin is not a ground pin; and setting the first wire setting to correspond to the second wire setting if the pin is a ground pin and the second pin is not a ground pin.

Moreover, the second performing may further include outputting a notification of a ground pin error if the first wire setting is larger than a setting of the pin and the pin is a ground pin or if the first wire setting is larger than a setting of the second pin and the second pin is a ground pin and outputting a notification of a pin and a second pin mismatch if the pin is not a ground pin or the second pin is not a ground pin.

The controller 101 may output a notification of a ground pin error if the first wire setting is larger than a setting of the pin and the pin is a ground pin or if the first wire setting is larger than a setting of the second pin and the second pin is a ground pin; and output a notification of a pin and a second pin mismatch if the pin is not a ground pin or the second pin is not a ground pin.

The controller 101 may for each signal from among the plurality of signals, third perform: determining unset wires that are part of a signal; setting the first wire setting of the unset wires to a largest from among the first wire setting of all wires that are part of the signal; and report a signal if all wires on the signal are unset The controller 101 may control to report the signal if it is determined that the signal has more than one wire setting assigned to wires on the signal and may report a ground stud error if the signal has at least one wire with the wire setting larger than the pin setting of the ground pin assigned to the signal. The controller 101 may control to report the signal and the ground stud error by controlling to display information on a display screen.

The controller 101 may control to display a wiring diagram including one or more from among the plurality of wires, the plurality of pins, the plurality of pin settings corresponding the plurality of pins, the first wire setting, and the second wire setting. Further, highlighting, outlining or distinguishing may be used to report the signal with more than one wire setting assigned to wires on the signal and the pin with the ground stud error.

Figure 2A:
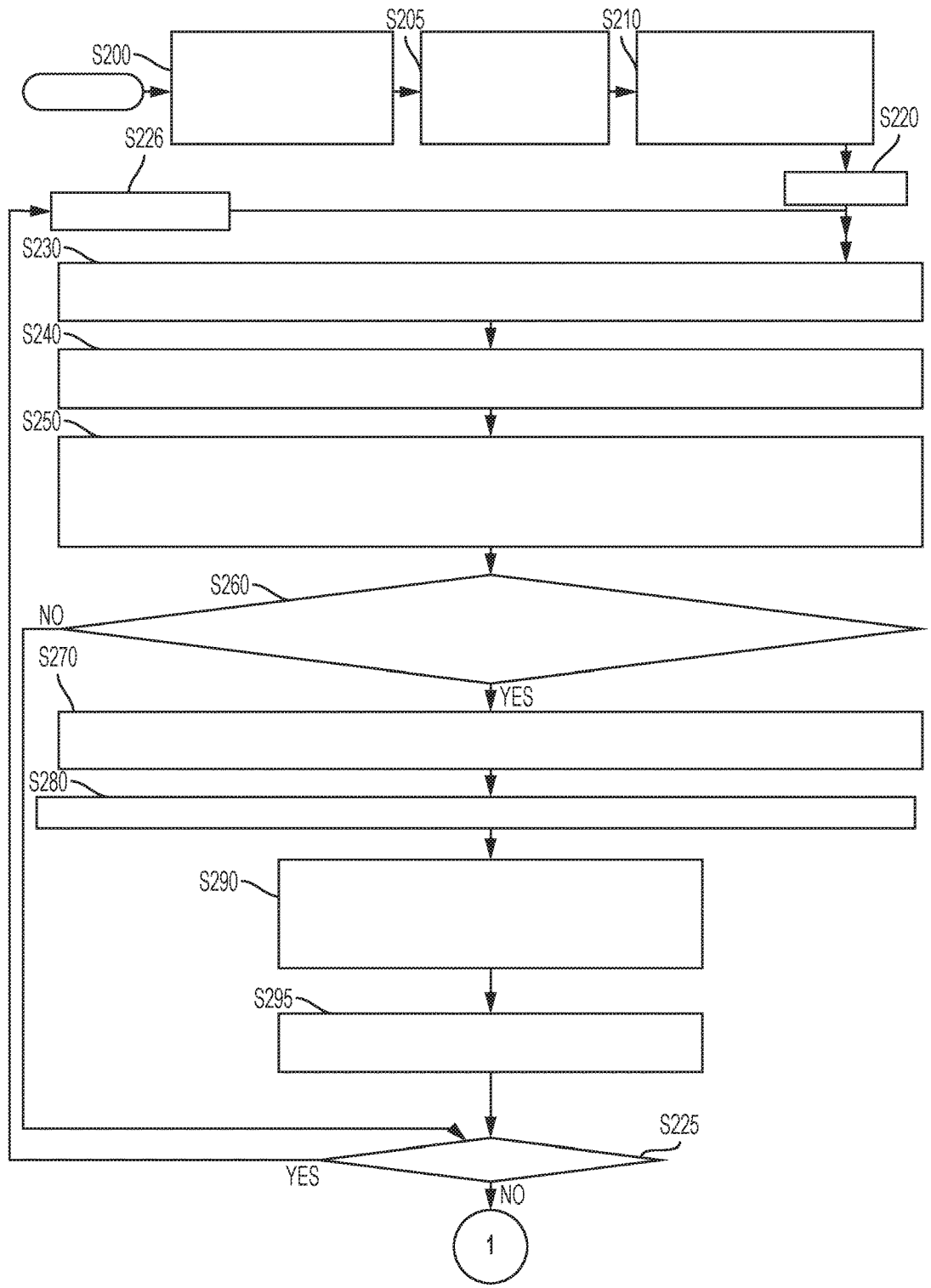
FIG. 2A shows a flowchart for a method of configuring settings of wires in an electrical system according to an exemplary embodiment.

FIG. 2A shows a flowchart for a method of configuring settings of wires in an electrical system according to an aspect of an exemplary embodiment. The method of FIG. 2A may be performed by the apparatus for configuring wire settings 100 or may be encoded into a computer readable medium as instructions that are executable by a computer to perform the method.

Referring to FIG. 2A, in operation S200, information on a plurality of pin settings corresponding to a plurality of pins is received. In operation S205, information on a plurality of wires connected to the plurality of pins is received. In addition, information on a plurality of connector settings of a plurality of connectors is received in operation S210.

A first wire to be checked is retrieved in operation S220. In operation S230, setting a first wire setting of a wire from among the plurality of wires to a pin setting of a pin attached to the wire from among the plurality of pins is performed if the pin has a pin setting. In operation S240, setting the first wire setting to a first connector setting of a first connector attached to the pin from among the plurality of connectors is performed if the pin does not have a pin setting and the connector setting includes a default setting. In operation S250, setting the first wire setting to at least one from among: 1) a second pin setting of a second pin attached to the wire from among the plurality of pins; and 2) a second connector setting of a second connector attached to the second pin from among the plurality of connectors is performed if the pin does not have a pin setting and the first connector setting does not have a default setting.

Moreover, in operation S260, it is determined whether there is a conflict between the first wire setting and a second wire setting of the wire corresponding to the second pin attached to the wire from among the plurality of pins a first. If there is no conflict (operation S260-NO), the method proceeds to S225 to process remaining wires to be checked. If there is a conflict (operation S260-YES), the process proceeds to operation S270 to perform setting the first wire setting to a larger setting from among the first wire setting and the second wire setting if the pin is a ground pin and the second pin is a ground pin or if the pin is a not a ground pin and the second pin is not a ground pin. Further, in operation S280, the first wire setting is set to correspond to the second wire setting if the pin is a ground pin and the second pin is not a ground pin.

A notification of a ground pin error may be output in operation S290 if the first wire setting is larger than a setting of the pin and the pin is a ground pin or if the first wire setting is larger than a setting of the second pin and the second pin is a ground pin. Moreover, a notification of a pin and a second pin mismatch may be output in operation S295 if the pin is not a ground pin or the second pin is not a ground pin. The notification may be output by the output 104 in the manners described above.

In operation S255, it determined whether there are more wires to process. If there are more wires to process (operation S225-YES), then the next wire to be processed is retrieved in operation S226. If there are no more wires to be processed (operation S225-NO), then the process proceeds to S300 shown below in FIG. 2B.

The plurality of pin settings corresponding the plurality of pins, the first wire setting, the connector setting, and the second wire setting may include at least one from among a size, a wire gauge, a diameter, and a rating.

Figure 2B:
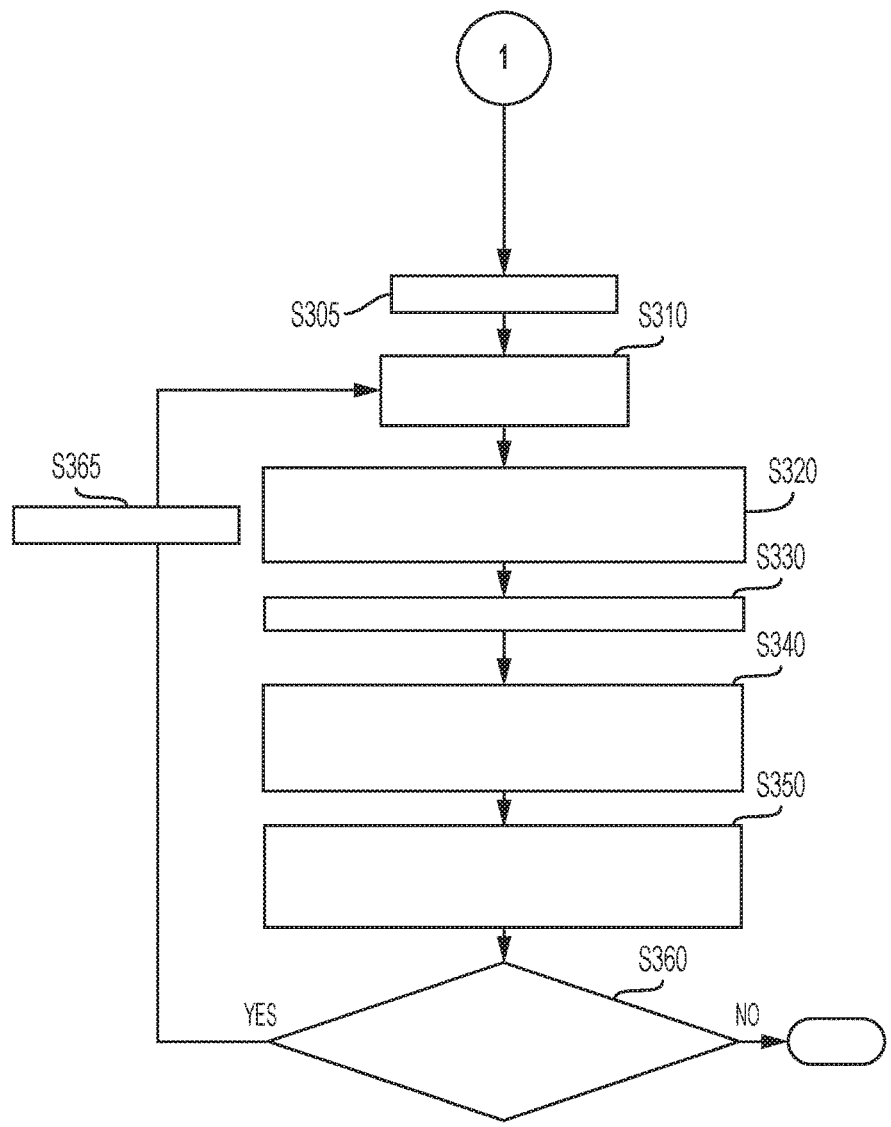
FIG. 2B shows a flowchart for a method of configuring settings of wires in an electrical system according to an exemplary embodiment.

FIG. 2B shows a flowchart for a method of configuring settings of wires in an electrical system according to an aspect of an exemplary embodiment. The method of FIG. 2B may be performed by the apparatus for configuring wire settings 100 or may be encoded into a computer readable medium as instructions that are executable by a computer to perform the method.

Referring to FIG. 2B, it is determined whether there are signals, including wires, pins, connectors and their respective settings, to be checked and the first signal to be checked is selected in operation S305.

In operation S310, the wires without settings or unset wires that are part of the signal to be checked are determined. In operation S320, the first wire setting of the unset wires are set to a largest wire setting from among the first wire setting of all wires that are part of the signal. In operation S330, a signal is reported if all wires on the signal are unset or lack a setting. In addition, the signal is reported in operation S340 if it is determined that the signal has more than one wire setting assigned to wires on the signal. Moreover, in operation S350, a ground stud error is reported if the signal has at least one wire with the wire setting larger than the pin setting of the ground pin assigned to the signal.

In operation S360, if there are more signals to be checked (operation S360-YES), the next signal to be checked is retrieved (operation S365). If there are no more signals to be checked (operation S360-NO), the process ends.

A wiring diagram including one or more from among the plurality of wires, the plurality of pins, the plurality of pin settings corresponding the plurality of pins, the first wire setting, and the second wire setting may be displayed during this process. Further, highlighting, outlining or distinguishing may be used to report the signal with more than one wire setting assigned to wires on the signal and the pin with the ground stud error.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for configuring settings of wires in an electrical system, the method comprising:
   receiving, via a user input or a communication device, information on a plurality of pin settings corresponding to a plurality of pins;
   receiving information, via a user input or a communication device, on a plurality of connector settings of a plurality of connectors;
   receiving information, via a user input or a communication device, on a plurality of wires connected to the plurality of pins; and
   for each wire of the plurality of wires, first performing:
      setting a first wire setting of a wire from among the plurality of wires to a pin setting of a pin attached to the wire from among the plurality of pins if the pin has a pin setting;
      setting the first wire setting to a first connector setting of a first connector attached to the pin from among the plurality of connectors if the pin does not have a pin setting and the connector setting includes a default setting;
      setting the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and
      in response to detecting a conflict between the first wire setting and a second wire setting of the wire corresponding to the second pin attached to the wire from among the plurality of pins, second performing:
         setting the first wire setting to a larger setting from among the first wire setting and the second wire setting if the pin is a ground pin and the second pin is a ground pin or if the pin is a not a ground pin and the second pin is not a ground pin;
         setting the first wire setting to correspond to the second wire setting if the pin is a ground pin and the second pin is not a ground pin;
         displaying a notification of a ground pin error if the first wire setting is larger than a setting of the pin and the pin is a ground pin or if the first wire setting is larger than a setting of the second pin and the second pin is a ground pin; and
         displaying a notification of a pin and a second pin mismatch if the pin is not a ground pin or the second pin is not a ground pin.

2. The method of claim 1, further comprising for each signal from among the plurality of signals, third performing:
   determining unset wires that are part of a signal;
   setting the first wire setting of the unset wires to a largest from among the first wire setting of all wires that are part of the signal; and
   reporting a signal if all wires on the signal are unset.

3. The method of claim 2, wherein the third performing further comprises:
   determining whether the signal has more than one wire setting assigned to wires on the signal; and reporting the signal if it is determined that the signal has more than one wire setting assigned to wires on the signal.

4. The method of claim 3, wherein the third performing further comprises:
determining whether the signal has at least one wire with a wire setting larger than a pin setting of a ground pin assigned to the signal; and
reporting a ground stud error if the signal has at least one wire with the wire setting larger than the pin setting of the ground pin assigned to the signal.

5. The method of claim 4, wherein the reporting the signal and the reporting the ground stud error comprise displaying information on a display screen.

6. The method of claim 5, further comprising displaying a wiring diagram comprising one or more from among the plurality of wires, the plurality of pins, the plurality of pin settings corresponding the plurality of pins, the first wire setting, and the second wire setting.

7. The method of claim 5, further comprising highlighting, outlining or distinguishing the signal with more than one wire setting assigned to wires on the signal and the pin with the ground stud error.

8. The method of claim 1, wherein the plurality of pin settings corresponding the plurality of pins, the first wire setting, the connector setting, and the second wire setting comprise at least one from among a size, a wire gauge, a diameter, and an electrical rating.

9. A non-transitory computer readable medium comprising computer executable instructions executable by a processor to perform the method of claim 1.

10. An apparatus for configuring settings of wires in an electrical system, the apparatus comprising:
a user input
a communication device;
at least one memory comprising computer executable instructions; and
at least one processor configured to read and execute the computer executable instructions, the computer executable instructions causing the at least one processor to:
receive, via the user input or the communication device, information on a plurality of pin settings corresponding to a plurality of pins;
receive, via the user input or the communication device, information on a plurality of connector settings of a plurality of connectors;
receive, via the user input or the communication device, information on a plurality of wires connected to the plurality of pins; and
for each wire of the plurality of wires, first perform:
set a first wire setting of a wire from among the plurality of wires to a pin setting of a pin attached to the wire from among the plurality of pins if pin has a pin setting;
set the first wire setting to a first connector setting of a first connector attached to the pin from among the plurality of connectors if the pin does not have a pin setting and the connector setting includes a default setting;
set the first wire setting to at least one from among: 1) a second pin setting of a second pin attached to the wire from among the plurality of pins; and 2) a second connector setting of a second connector attached to the second pin from among the plurality of connectors if the pin does not have a pin setting and the first connector setting does not have a default setting; and in response to detecting a conflict between the first wire setting and a second wire setting of the wire corresponding to the second pin attached to the wire from among the plurality of pins, second perform:
set the first wire setting to a larger setting from among the first wire setting and the second wire setting if the pin is a ground pin and the second pin is a ground pin or if the pin is a not a ground pin and the second pin is not a ground pin;
set the first wire setting to correspond to the second wire setting if the pin is a ground pin and the second pin is not a ground pin;
displaying a notification of a ground pin error if the first wire setting is larger than a setting of the pin and the pin is a ground pin or if the first wire setting is larger than a setting of the second pin and the second pin is a ground pin; and
displaying a notification of a pin and a second pin mismatch if the pin is not a ground pin or the second pin is not a ground pin.

11. The apparatus of claim 10, wherein the computer executable instructions further cause the at least one processor to:
for each signal from among the plurality of signals, third perform:
determine unset wires that are part of a signal;
set the first wire setting of the unset wires to a largest from among the first wire setting of all wires that are part of the signal; and
report a signal if all wires on the signal are unset.

12. The apparatus of claim 11, wherein the third performing further comprises:
determining whether the signal has more than one wire setting assigned to wires on the signal; and
reporting the signal if it is determined that the signal has more than one wire setting assigned to wires on the signal.

13. The apparatus of claim 12, wherein the third performing further comprises:
determining whether the signal has at least one wire with a wire setting larger than a pin setting of a ground pin assigned to the signal; and
reporting a ground stud error if the signal has at least one wire with the wire setting larger than the pin setting of the ground pin assigned to the signal.

14. The apparatus of claim 13, wherein the reporting the signal and the reporting the ground stud error comprise displaying information on a display screen.

15. The apparatus of claim 14, wherein the computer executable instructions further cause the at least one processor to display a wiring diagram comprising one or more from among the plurality of wires, the plurality of pins, the plurality of pin settings corresponding the plurality of pins, the first wire setting, and the second wire setting.

16. The apparatus of claim 14, wherein the computer executable instructions further cause the at least one processor to highlight, outline or distinguish the signal with more than one wire setting assigned to wires on the signal and the pin with the ground stud error.

17. The apparatus of claim 10, wherein the plurality of pin settings corresponding the plurality of pins, the first wire setting, the connector setting, and the second wire setting comprise at least one from among a size, a wire gauge, a diameter, and an electrical rating.

* * * * *